United States Patent Office 3,426,058
Patented Feb. 4, 1969

3,426,058
PREPARATION OF ISOCYANATE COMPOSITIONS
Charles R. Wagner, Hamburg, Andrew Shultz, Williamsville, Robert A. Allen, Kenmore, and Cecil A. Friedman, Erie, N.Y., assignors to Allied Chemical Corporation, New York, N.Y., a corporation of New York
No Drawing. Filed Mar. 2, 1965, Ser. No. 436,647
U.S. Cl. 260—453                    2 Claims
Int. Cl. C07c *119/04;* C08g *41/00, 53/10*

ABSTRACT OF THE DISCLOSURE

Process for the corrrelative preparation of a mixture of 80%±2% 2,4-tolylene diioscyanate and 20% ±2% 2,6-tolylene diisocyanate and a tolylene diamine phosgenation product comprising a tolylene diisocyanate solution of congeneric non-volatile polyisocyanate solutes, said solution having an amine equivalent between about 90 and about 125, comprising (a) distilling a tolylene diamine phosgenation product prepared by the phosgenation of a mixture of 2,4-tolylene diamine and 2,6-tolylene diamine, said phosgenation product comprising a tolylene diisocyanate solution of congeneric non-volatile polyisocyanate solutes, until the distillate, which is over 50% by weight of the phosgenation product, becomes a mixture of 80±2% by weight 2,4-tolylene diisocyanate and 20 ±2% by weight 2,6-tolylene diisocyanate; and (b) adding sufficient distillate to the distilland until the amine equivalent of the distilland is about 90 to 125.

---

This invention relates to a process for the preparation of commercially valuable polyisocyanate compositions and, more particularly, to the corrrelative preparation of an isomeric tolylene diisocyanate mixture and a particular crude tolylene diamine phosgenation product.

A mixture of 80% 2,4-tolylene diisocyanate and 20% 2,6-tolylene diisocyanate and a tolylene diamine phosgenation product comprising a tolylene diisocyanate solution of congeneric non-volatile polyisocyanate solutes, the tolylene diisocyanate solution having an amine equivalent between about 90 and about 125, are commercially well-known products finding utility in the polyurethane field. The former, i.e., the mixture of 80% 2,4-tolylene diisocyanate and 20% 2,6-tolylene diisocyanate, is sold commercially as "Nacconate" 80, which is described by Rose in the Condensed Chemical Dictionary, 6th edition, Reinhold Publishing Corp., 1961, at page 773. The latter, i.e., the tolylene diamine phosgenation product, is sold commercially as "Nacconate" 4040, which is referred to by Ferrigno in Rigid Plastic Foams, Reinhold Publishing Corp., 1963, at pages 5 to 10.

Tolylene diamine phosgenation products having an amine equivalent between about 98 and about 120 are exemplified and disclosed in the copending application of Melvin Kaplan, Ser. No. 225,873, filed Sept. 24, 1962, now U.S. Patent 3,215,652, wherein tolylene diamine phosgenation products are prepared by reacting a mixture of 80% 2,4-tolylene diamine and 20% 2,6-tolylene diamine with phosgene in the presence of a solvent and then distilling solvent and tolylene diisocyanate from the reaction mixture until the distilland is composed of a tolylene phosgenation product comprising a tolylene diisocyanate solution of congeneric non-volatile polyisocyanate solutes, said solution having an amine equivalent between about 98 and about 120. The distilland, as noted above, is commercially valuable. On the other hand, the distillate was found to be a mixture of 2,4-tolylene diisocyanate and 2,6-tolylene diisocyanate in such undesirable proportions that the 2,4-tolylene diisocyanate was less than 78% by weight of the mixture. In order to make use of the distillate, i.e., provide the commercially valuable 80/20 mixture, the distillate could be subjected to elaborate refining procedures or the addition of pure and expensive 2,4-tolylene diisocyanate to the mixture, if available.

An object of this invention is to provide a process for th correlative preparation of two commercially desirable materials, i.e., a mixture of 80% 2,4-tolylene diisocyanate and 20% 2,6-tolylene diisocyanate and a tolylene diamine phosgenation product comprising a tolylene diisocyanate solution of congeneric non-volatile polyisocyanate solutes, said solution having an amine equivalent between about 90 and about 125, especially between 98 and 120.

Other objects and advantages will become apparent hereinafter.

We have fortuitously discovered a process for the correlative preparation of the two commercially desirable materials mentioned heretofore, i.e., a mixture of 80±2% by weight 2,4-tolylene diiocyanate and 20±2% by weight 2,6-tolylene diisocyanate and a tolylene diamine phosgenation product comprising a tolylene diisocyanate solution of congeneric non-volatile polyisocyanate solutes, said solution having an amine equivalent between about 90 and about 125, comprising the steps: (a) distilling a tolylene diamine phosgenation product prepared by the phosgenation of a mixture of about 80±2% by weight 2,4-tolylene diamine and about 20±2% by weight 2,6-tolylene diamine, said phosgenation product comprising a tolylene diisocyanate solution of congeneric non-volatile polyisocyanate solutes, the solution having an amine equivalent less than about 90 and including 2,4-tolylene diisocyanate and 2,6-tolylene diisocyanate (the distillation is effected without regard to the amine equivalent, even though the desired amine equivalent for the distilland is between about 90 to about 125) until the distillate surprisingly becomes a mixture of 80±2% by weight 2,4-tolylene diisocyanate and 20±2% by weight 2,6-tolylene diisocyanate (at this point the amine equivalent of the distilland may be greater than about 125); and then (b) returning sufficient distillate to the distilland until the amine equivalent of the distilland is between about 90 and about 125.

The symbol ± is defined as plus or minus two percent by weight which is sufficient tolerance for the commercial product of the mixture of 80% by weight 2,4-tolylene diisocyanate and 20% by weight 2,6-tolylene diisocyanate. In other words a ratio of 78% to about 82% by weight of 2,4-tolylene diisocyanate to 18% to 22% 2,6-tolylene diisocyanate provides a satisfactory mixture for the uses to which this mixture is to be subjected in the polyurethane art. It is contemplated that all 80/20 isomeric mixtures of diisocyanates or diamines referred to herein are ± values, i.e., these values are considered to cover the range of two percent by weight on the positive or negative side of the value, such values being by weight.

The Kaplan application referred to, supra, discloses a tolylene diamine phosgenation product comprising a tolylene diisocyanate solution of congeneric non-volatile polyisocyanate solutes, said solution having an amine equivalent between about 98 and about 120, and preferably between about 102 and about 108. This tolylene diamine phosgenation product can be prepared by a process comprising the following steps:

(1) Mixing an 80/20 mixture of 2,4- and 2,6-tolylene diamines with phosgene and a non-reactive organic solvent, such as dichlorobenzene, at between about −20° C. and 100° C. in such proportions that the molar ratio of phosgene to tolylene diamine is at least 2.2 (preferably between 2.3 and 6) and the weight ratio of tolylene diamine to solvent is between about 0.05 and 0.50 (preferably between about 0.1 and 0.3) said solvent having a relative volatility vs. tolylene diisocyanate at 140° C. of between 4 and 100, preferably between 8 and 50; (2) heating the reaction mixture through a temperature range between the mixing temperature and a maximum temperature between 100° C. and 200° C. at a superatmospheric pressure sufficient to maintain a stoichiometric excess of phosgene in the reaction medium until the phosgenation reaction is substantially complete; (3) separating phosgene and hydrogen chloride from the resulting solution of phosgenate; and (4) distilling solvent and tolylene diisocyanate from said solution of phosgenate until the residual concentrated distilland comprises a tolylene diisocyanate solution of congeneric non-volatile solutes having an amine equivalent of between about 98 and about 120.

As stated above, the practice of the art was to take the distillate of this process, which is a mixture of less than 78% by weight 2,4-tolylene diisocyanate with greater than 22% by weight 2,6-tolylene diisocyanate and add either pure and expensive 2,4-tolylene diisocyanate or carry out elaborate refining procedures to get the commercially desirable 80/20 ratio. We have now found that by initially disregarding the amine equivalent of the distilland, the distillate reaches the 80/20 ratio after more than 50% by weight of the initial phosgenation product has been distilled over. By returning a portion of the distillate, which can be in the range of about 20% to about 60% by weight of the distilland to the distilland until the amine equivalent of the distilland reaches between about 98 and about 120, two commercially valuable products are made available.

The distillation step of the present invention can be carried out according to conventional distillation techniques and the step is preferably carried out under vacuum. Standard equipment is satisfactory.

The process of the present invention is preferably conducted in a continuous manner as follows:

A crude tolylene diamine phosgenation mixture obtained by conventional phosgenation of a 2,4- and 2,6-tolylene diamine mixture containing about 80% 2,4- and about 20% 2,6-isomers in an inert solvent, such as dichlorobenzene, is continuously distilled in an evaporator until a distillate is recovered, which is over 50% by weight of the phosgenation product, comprising a mixture of 80% 2,4-tolylene diisocyanate and 20% 2,6-tolylene diisocyanate and a small amount of solvent and a distilland, which is continuously transferred to a storage tank. The distillate is stripped of solvent and divided into two streams, one of which is transferred to a product column for final processing and the other fed into another storage tank. The contents of the two storage tanks, i.e., the distilland and the distillate are then blended until the amine equivalent of the distilland is between about 98 and about 120.

Isocyanate equivalent weight or "amine equivalent"

Isocyanate equivalent weights are measured by an analytical procedure which involves reacting the isocyanate groups in the sample with n-dibutyl amine to form the corresponding urea groups and back titrating excess n-butylamine with HCl solution. The procedure is as follows: weight 6 to 8 grams of sample, dilute with 35 to 50 cc. of toluene, add 20 cc. of a 2 N solution of dibutylamine in toluene, heat 5 to 10 minutes (do not boil), cool, add 100 cc. methanol, titrate with 1 N HCl solution to an end point pH of 4.2 to 4.5 using a pH meter, run a blank. The results may be calculated as either weight percent NCO group in the sample or as so-called "amine equivalent," i.e., the weight of sample containing 1 equivalent weight (42 grams) of NCO group. The applicable equations are:

$$\text{Percent } NCO = 4.2\,(TB-TS)N/WS$$

$$AE = \frac{1000\,WS}{(TB-TS)\,N}$$

wherein

AE = amine equivalent
WS = weight of sample in grams
TB = titration of blank in ml. HCl
TS = titration of sample in ml. HCl
N = normality of HCl The process of this invention is illustrated by the following example, in which parts and percentages are by weight.

EXAMPLE

Two-thousand pounds per hour of crude tolylene diisocyanate, obtained by conventional phosgenation of a mixture of about 80% 2,4- and about 20% 2,6-tolylene diamines in dichlorobenzene solvent, after degassing and solvent removal, are fed continuously into an evaporator, which is operated at a temperature of 153° C. and at a pressure of 17 millimeters of Hg. In the evaporator, tolylene diisocyanate is flash-distilled as an overhead fraction at the rate of about 1200 pounds per hour into a column which is maintained at a temperature of about 180° C. and at a pressure of 110 millimeters of Hg and in which any residual solvent is removed. The distilland in the evaporator is withdrawn into a first storage tank. The tolylene diisocyanate isomeric mixture is withdrawn from the column at a rate of about 1195 pounds per hour until it is composed of 2,4-tolylene diisocyanate and 2,6-tolylene diisocyanate in an average ratio of 79.5 parts to 20.5 parts and is divided into two effluent streams: one of the streams is for final processing of the tolylene diisocyanate product containing 2,4-tolylene diisocyanate and 2,6-tolylene diisocyanate in the above-mentioned ratio; the second stream is fed into a second storage tank. The contents of the two storage tanks are blended in the ratio of 2 parts of distilland to 1 part of distillate yielding a tolylene diamine phosgenation product suitable for the manufacture of urethane polymers having an amine equivalent of 107 and an average viscosity of 50 to 60 centipoises.

We claim:

1. A process for the correlative preparation of a mixture of about 80±2% by weight of 2,4-tolylene diisocyanate and about 20±2% by weight of 2,6-tolylene diisocyanate and a tolylene diamine phosgenation product comprising a tolylene diisocyanate solution of congeneric non-volatile polyisocyanate solutes, said solution having an amine equivalent between about 90 and about 125, comprising the steps:

(a) distilling a tolylene diamine phosgenation product prepared by the phosgenation of a mixture of about 80±2% by weight 2,4-tolylene diamine and about 20±2% by weight 2,6-tolylene diamine, said phosgenation product comprising a tolylene diisocyanate solution of congeneric non-volatile polyisocyanate solutes, until the distillate becomes a mixture of about 80±2% by weight of 2,4-tolylene diisocyanate and about 20±2% by weight of 2,6-tolylene diisocyanate; and (b) returning sufficient distillate to the distilland until the amine equivalent of the distilland is between about 90 and about 125.

2. A process for the correlative preparation of a mixture of 80±2% by weight 2,4-tolylene diisocyanate and about 20±2% by weight of 2,6-tolylene diisocyanate and a tolylene diamine phosgenation product comprising a tolylene diisocyanate solution of congeneric non-volatile polyisocyanate solutes, said solution having an amine equivalent between about 98 and about 120 comprising the steps: (a) distilling a tolylene diamine phosgenation product prepared by the phosgenation of a mixture of 80±2% by weight of 2,4-tolylene diamine and 20±2% by weight of 2,6-tolylene diamine, said phosgenation product comprising a tolylene diisocyanate solution of congeneric non-volatile polyisocyanate solutes, until a distillate, which is at least 50% by weight of the initial phosgenation product, becomes a mixture of about 80±2% by weight of 2,4-tolylene diisocyanate and about 20±2% by weight of 2,6-tolylene diisocyanate; and (b) returning distillate in an amount of about 20% to about 60% by weight of the distilland to the distilland until the amine equivalent of the distilland is between about 98 and about 120.

References Cited
UNITED STATES PATENTS 3,215,652  11/1965  Kaplan _____ 260—453 XR CHARLES B. PARKER, *Primary Examiner.*

D. H. TORRANCE, *Assistant Examiner.*

U.S. Cl. X.R.

260—2.5, 77.5